(12) United States Patent
Decristofaro et al.

(10) Patent No.: US 7,144,468 B2
(45) Date of Patent: Dec. 5, 2006

(54) METHOD OF CONSTRUCTING A UNITARY AMORPHOUS METAL COMPONENT FOR AN ELECTRIC MACHINE

(75) Inventors: Nicholas J. Decristofaro, Chatham, NJ (US); Scott M. Lindquist, Myrtle Beach, SC (US); Sastry S. Renduchintala, Myrtle Beach, SC (US); Carl E. Kroger, Aynor, SC (US)

(73) Assignee: Metglas, Inc., Conway, SC (US)

(*) Notice: Subject to any disclaimer, the term of this patent is extended or adjusted under 35 U.S.C. 154(b) by 314 days.

(21) Appl. No.: 10/235,068

(22) Filed: Sep. 5, 2002

(65) Prior Publication Data

US 2004/0046470 A1   Mar. 11, 2004

(51) Int. Cl.
*H01F 1/12* (2006.01)

(52) U.S. Cl. ............... 156/185; 156/191; 156/193; 310/45; 310/46

(58) Field of Classification Search ............... 156/185; 310/42, 211, 216, 268, 254; 29/598, 609, 29/596, 606
See application file for complete search history.

(56) References Cited

U.S. PATENT DOCUMENTS

| | | | |
|---|---|---|---|
| 2,469,808 A * | 5/1949 | Aske .................... | 310/268 |
| 3,845,547 A | 11/1974 | Reynolds .................... | 29/596 |
| 4,187,441 A | 2/1980 | Oney .................... | 310/112 |
| 4,201,837 A | 5/1980 | Lupinski .................... | 428/457 |
| 4,255,684 A | 3/1981 | Mischler et al. ............ | 310/216 |
| 4,268,325 A | 5/1981 | O'Handley et al. ......... | 148/108 |
| 4,286,188 A | 8/1981 | Honsinger et al. .......... | 310/162 |
| 4,343,347 A | 8/1982 | Liebermann et al. ....... | 164/463 |
| 4,363,988 A | 12/1982 | Kliman .................... | 310/268 |
| 4,385,935 A | 5/1983 | Skjeldal .................... | 106/98 |
| 4,392,072 A | 7/1983 | Rosenberry ............... | 310/216 |
| 4,392,073 A | 7/1983 | Rosenberry, Jr. ........... | 310/216 |
| 4,394,597 A | 7/1983 | Mas .................... | 310/268 |
| 4,403,401 A | 9/1983 | Rosenberry ............... | 29/596 |
| 4,427,462 A | 1/1984 | Senno et al. .............. | 148/31.55 |
| 4,578,610 A | 3/1986 | Kliman et al. .............. | 310/156 |
| 4,716,556 A | 12/1987 | Raskin et al. .............. | 367/168 |
| 4,734,975 A | 4/1988 | Ballard et al. ............... | 29/606 |
| 4,763,030 A | 8/1988 | Clark et al. .................. | 310/26 |
| 4,892,773 A | 1/1990 | Chenoweth et al. ........ | 428/121 |

(Continued)

FOREIGN PATENT DOCUMENTS

EP      0 058 269 A1    8/1982

(Continued)

OTHER PUBLICATIONS

PCT International Search Report dated May 18, 2000 for PCT/US99/26276.

(Continued)

*Primary Examiner*—Richard Crispino
*Assistant Examiner*—Christopher Schatz

(57) ABSTRACT

A unitary amorphous metal magnetic component for an axial flux electric machine such as a motor or generator is formed from a spirally wound annular cylinder of ferromagnetic amorphous metal strips. The cylinder is adhesively bonded and provided with a plurality of slots formed in one of the annular faces of the cylinder and extending from the inner diameter to the outer diameter of the cylinder. The component is preferably employed in constructing a high efficiency, axial flux electric motor. When operated at an excitation frequency "f" to a peak induction level $B_{max}$ the unitary amorphous metal magnetic component has a core-loss less than "L" wherein L is given by the formula $L = 0.0074 f(B_{max})^{1.3} + 0.000282 f^{1.5}(B_{max})^{2.4}$, the core loss, excitation frequency and peak induction level being measured in watts per kilogram, hertz, and teslas, respectively.

16 Claims, 4 Drawing Sheets

U.S. PATENT DOCUMENTS

| | | | |
|---|---|---|---|
| 5,028,830 A * | 7/1991 | Mas | 310/211 |
| 5,134,771 A | 8/1992 | Lee et al. | 29/609 |
| 5,160,379 A | 11/1992 | Yoshizawa | 148/108 |
| 5,252,877 A | 10/1993 | Sawa et al. | 310/214 |
| 5,258,681 A | 11/1993 | Hibino et al. | 310/214 |
| 5,270,595 A | 12/1993 | Wisner | 310/26 |
| 5,355,045 A | 10/1994 | Hisey | 310/259 |
| 5,396,138 A * | 3/1995 | Steiner | 310/254 |
| 5,439,534 A | 8/1995 | Takeuchi et al. | 148/105 |
| 5,496,418 A * | 3/1996 | Ramanan et al. | 148/304 |
| 5,522,948 A | 6/1996 | Sawa et al. | 148/308 |
| 5,671,524 A * | 9/1997 | Damsky et al. | 29/596 |
| 5,731,649 A | 3/1998 | Caamano | 29/216 |
| 5,873,954 A | 2/1999 | Liebermann et al. | 148/304 |
| 5,935,347 A | 8/1999 | Suzuki et al. | 148/121 |
| 6,106,376 A | 8/2000 | Georgopolos et al. | |
| 6,331,363 B1 | 12/2001 | DeCristofaro et al. | 428/692 |
| 6,346,337 B1 | 2/2002 | DeCristofaro et al. | 428/692 |
| 6,348,275 B1 | 2/2002 | DeCristofaro et al. | 428/692 |
| 6,425,176 B1 * | 7/2002 | Ozawa et al. | 29/596 |
| 6,603,237 B1 * | 8/2003 | Caamano | 310/254 |
| 2001/0007266 A1 * | 7/2001 | Sunakawa et al. | 148/403 |

FOREIGN PATENT DOCUMENTS

| | | |
|---|---|---|
| EP | 0 430 085 A2 | 6/1991 |
| JP | 57-148561 | 9/1982 |
| JP | 61-058450 | 3/1986 |
| JP | 61-058451 | 3/1986 |
| JP | 61-58451 A | 8/1986 |
| WO | WO 01/48889 A1 | 3/1986 |
| WO | WO 96/00449 | 1/1996 |
| WO | WO 98/33945 | 8/1998 |

OTHER PUBLICATIONS

International Search Report issued Dec. 16, 2003.

* cited by examiner

METHOD OF CONSTRUCTING A UNITARY AMORPHOUS METAL COMPONENT FOR AN ELECTRIC MACHINE

BACKGROUND OF THE INVENTION

1. Field of the Invention

This invention relates to a magnetic component for an electric machine, such as a motor; and more particularly, to a method of constructing a low core loss, unitary amorphous metal component, such as a rotor or stator, for a high efficiency, axial-flux electric motor.

2. Description of the Prior Art

Rotating electric machines almost always comprise at least two magnetic components, a stationary component termed a stator and a rotor appointed to rotate relative to the stator and about a defined rotation axis. Such a rotating machine allows energy to be exchanged between electrical and mechanical forms. Most familiarly, an electric motor is provided with a source of electrical energy, as from a battery or the electric power grid, that may be converted to usable mechanical work. On the other hand, a generator takes imposed mechanical work and converts it to electrical energy that may be used to operate other devices. In many cases the same structure may be used for both functions, depending on how the machine is connected electrically and mechanically.

A vast majority of rotating electrical machines operate electromagnetically. In such machines the rotor and stator normally comprise ferromagnetic materials. The components are used to either produce or direct a pattern of magnetic flux that varies either temporally or spatially or both. The conversion of energy between electrical and mechanical forms occurs in accordance with the well known principles of electromagnetism, especially Faraday's and Ampère's laws. In electromagnetic machines at least one of the rotor and stator is constructed using a soft ferromagnetic material and provided with a winding appointed to carry an electrical current and generate a magnetic field. Depending on the type of motor, the other component includes either permanent (hard) magnetic material or soft magnetic material that is excited by current-carrying windings or by induction. The soft magnetic materials most commonly used are low carbon steels and silicon-containing electrical steels, both of which are crystalline metallic materials.

The stator and the rotor in a machine are separated by small gaps that are either (i) radial, i.e., generally perpendicular to the axis of rotation of the rotor, or (ii) axial, i.e., generally parallel to the rotation axis and separated by some distance. In an electromagnetic machine, lines of magnetic flux link the rotor and stator by traversing the gaps. Electromagnetic machines thus may be broadly classified as radial or axial flux designs, respectively. The corresponding terms radial gap and axial gap are also used in the motor art.

Radial flux machines are by far most common. The rotors and stators used in such motors are frequently constructed of a plurality of laminations of electrical steel that are punched or otherwise cut to identical shape, stacked in registry, and laminated to provide a component having a requisite shape and size and sufficient mechanical integrity to maintain the configuration during production and operation of the motor.

One common design for a stator is generally cylindrical and includes a plurality of stacked laminations of non-oriented electrical steel. Each lamination has the annular shape of a circular washer along with plural "teeth" that form the poles of the stator. The teeth protrude from the inner diameter of the stacked laminations and point toward the open center of the cylindrical stator. Each of the laminations is typically formed by stamping mechanically soft, non-oriented electrical steel into the desired shape. The formed laminations are then stacked in registry and bonded to form a stator. During operation, the stator is periodically magnetized by a magnetic field, produced by a flow of electric current in windings that encircle the teeth of the stator. Such magnetization is needed to drive the motor; but causes unavoidable losses due to magnetic hysteresis. These losses contribute to an overall reduction in motor efficiency.

Axial flux designs are much less commonly used, in part because of the lack of suitable means for constructing components having the requisite electromagnetic properties and adequate mechanical integrity. Certain disclosures have suggested axial flux motor designs, including those found in U.S. Pat. No. 4,394,597 to Mas and U.S. Pat. No. 5,731,649 to Caamano. These teachings also suggest magnetic components that employ amorphous metals.

Although amorphous metals offer superior magnetic performance, including reduced hysteresis losses, when compared to non-oriented electrical steels, they have widely been regarded as not suitable for use in electric motors due to certain physical properties and the resulting impediments to conventional fabrication. For example, amorphous metals are thinner and harder than non-oriented steel. Consequently, conventional cutting and stamping processes cause fabrication tools and dies to wear more rapidly. The resulting increase in the tooling and manufacturing costs makes fabricating amorphous metal components such as rotors and stators using conventional techniques commercially impractical. The thinness of amorphous metals also translates into an increase in the number of laminations required for a component of a given stack height, further increasing its total manufacturing cost.

Amorphous metal is typically supplied in a thin continuous ribbon having a uniform ribbon width. However, amorphous metal is a very hard material, making it very difficult to cut or form easily. Once annealed to achieve peak magnetic properties, it becomes very brittle, making it difficult and expensive to use conventional approaches to construct amorphous metal magnetic components. The brittleness of amorphous metal also causes concern for the durability of a motor or generator that utilizes amorphous metal magnetic components. Magnetic stators are subject to extremely high magnetic forces, which change at very high frequencies. These magnetic forces are capable of placing considerable stresses on the stator material, and may damage an amorphous metal magnetic stator. Rotors are further subjected to mechanical forces due both to normal rotation and to rotational acceleration when the machine is energized or de-energized and when the loading changes, perhaps abruptly.

Another problem with amorphous metal magnetic components is that the magnetic permeability of amorphous metal material is reduced when it is subjected to physical stresses. This reduction in permeability may be considerable depending upon the intensity of the stresses on the amorphous metal material, as indicated by U.S. Pat. No. 5,731,649. As an amorphous metal magnetic stator is subjected to stresses, the efficiency at which it directs or focuses magnetic flux is reduced, resulting in higher magnetic losses, reduced efficiency, increased heat production, and reduced power. This phenomenon is referred to as magnetostriction and may be caused by stresses resulting from magnetic forces during the operation of the motor or generator, mechanical stresses resulting from mechanical clamping or otherwise bonding or fixing the magnetic stator in place, or internal stresses caused by the thermal expansion and/or expansion due to magnetic saturation of the amorphous metal material.

A limited number of non-conventional approaches have been proposed for constructing amorphous metal components. For example, U.S. Pat. No. 4,197,146 to Frischmann discloses a stator fabricated from molded and compacted amorphous metal flake. Although this method permits formation of complex stator shapes, the structure contains numerous air gaps between the discrete flake particles of amorphous metal. Such a structure greatly increases the reluctance of the magnetic circuit and thus the electric current required to operate the motor.

In order to avoid stress-induced degradation of magnetic properties, U.S. Pat. No. 5,731,649 discloses constructing amorphous metal motor components using a plurality of stacked or coiled sections of amorphous metal, and mounting these sections in a dielectric enclosure. The '649 patent further discloses that forming amorphous metal cores by rolling amorphous metal into a coil with lamination, using an epoxy, detrimentally restricts the thermal and magnetic saturation expansion of the coil of material, resulting in high internal stresses and magnetostriction that reduces the efficiency of a motor or generator incorporating such a core.

The approach taught by German Patents DE 28 05 435 and DE 28 05 438 divides the stator into wound pieces and pole pieces. A non-magnetic material is inserted into the joints between the wound pieces and pole pieces, increasing the effective gap, and thus increasing the reluctance of the magnetic circuit and the electric current required to operate the motor. The layers of material that comprise the pole pieces are oriented with their planes perpendicular to the planes of the layers in the wound back iron pieces. This configuration further increases the reluctance of the stator, because contiguous layers of the wound pieces and of the pole pieces meet only at points, not along full line segments, at the joints between their respective faces. In addition, this approach teaches that the laminations in the wound pieces are attached to one another by welding. The use of heat intensive processes, such as welding, to attach amorphous metal laminations will recrystallize the amorphous metal at and around the joint. Even small sections of recrystallized amorphous metal will normally increase the magnetic losses in the stator to an unacceptable level.

Moreover, amorphous metals have far lower anisotropy energies than other conventional soft magnetic materials, including common electrical steels. As a result, stress levels that would not have a deleterious effect on the magnetic properties of these conventional metals have a severe impact on magnetic properties important for motor components, e.g. permeability and core loss. For these reasons, U.S. Pat. No. 5,731,649 discloses a magnetic component comprising a plurality of segments of amorphous metal carefully mounted or contained in a dielectric enclosure without the use of adhesive bonding.

Notwithstanding the advances represented by the above disclosures, there remains a need in the art for methods of constructing improved amorphous metal motor components that exhibit a combination of excellent magnetic and physical properties needed for high speed, high efficiency electric machines, especially axial flux designs. Construction methods are also sought that use amorphous metal efficiently and can be implemented for high volume production of axial flux motors and the components used therein.

SUMMARY OF THE INVENTION

The present invention provides a method of constructing a single-piece or unitary amorphous metal magnetic component for a high efficiency, axial-flux electric motor. The component may be a rotor or stator. In one embodiment the component comprises a cylinder of annular cross section having cylindrical inner and outer surfaces, two opposed annular faces, an axial thickness separating the faces and a plurality of radial slots in at least one of the faces for receiving electrical windings. The cylinder is formed of spirally wound amorphous metal strip. The layers are preferably electrically insulated from one another to reduce eddy current losses. The unitary construction eliminates all magnetic gaps within the component, thereby providing a closed path through which magnetic flux may flow. The term "electric motor," as used herein, refers generically to a variety of rotating, dynamoelectric machines which, in addition to ordinary electric motors, may include electric generators as well as regenerative motors that may be operated optionally as electric generators.

A bulk amorphous metal magnetic motor component constructed in accordance with an aspect of the present invention exhibits very low core loss under periodic excitation. As a result, the magnetic component is operable at frequencies ranging from DC to as much as 20,000 Hz. It exhibits improved performance characteristics when compared to conventional silicon-steel magnetic components operated over the same frequency range. The component's operability at high frequency allows it to be used in fabricating motors that operate at higher speeds and with higher efficiencies than possible using conventional components. A magnetic component constructed in accordance with the present invention and excited at an excitation frequency "f" to a peak induction level "$B_{max}$" may have a core loss at room temperature less than "L" wherein L is given by the formula $L=0.0074f\ (B_{max})^{1.3}+0.000282f^{1.5}\ (B_{max})^{2.4}$, the core loss, the excitation frequency and the peak induction level being measured in watts per kilogram, hertz, and teslas, respectively. The magnetic component may have (i) a core-loss equal to or less than about 1 watt-per-kilogram of amorphous metal material when operated at a frequency of approximately 60 Hz and at a flux density of approximately 1.4 Tesla (T); (ii) a core-loss equal to or less than about 12 watts-per-kilogram of amorphous metal material when operated at a frequency of approximately 1000 Hz and at a flux density of approximately 1.0 T; or (iii) a core-loss equal to or less than about 70 watt-per-kilogram of amorphous metal material when operated at a frequency of approximately 20,000 Hz and at a flux density of approximately 0.30T.

The unitary amorphous metal magnetic component of the present invention can be manufactured using numerous ferromagnetic amorphous metal alloys. Generally stated, the amorphous metal consists essentially of an alloy having the formula: $M_{70-85}\ Y_{5-20}\ Z_{0-20}$, subscripts in atom percent, where "M" is at least one of Fe, Ni and Co, "Y" is at least one of B, C and P, and "Z" is at least one of Si, Al and Ge; with the proviso that (i) up to ten (10) atom percent of component "M" can be replaced with at least one of the metallic species Ti, V, Cr, Mn, Cu, Zr, Nb, Mo, Ta, Hf, Ag, Au, Pd, Pt, and W, (ii) up to ten (10) atom percent of components (Y+Z) can be replaced by at least one of the non-metallic species In, Sn, Sb and Pb, and (iii) up to about one (1) atom percent of the components (M+Y+Z) can be incidental impurities.

The present invention also provides a method for constructing a low core loss, unitary amorphous metal motor component. Generally stated, the method comprises the steps of: (i) spirally winding ferromagnetic amorphous metal strip or ribbon material to form a wound cylinder of annular cross-section having cylindrical inner and outer surfaces and two annular faces, the faces being separated by an axial thickness; (ii) heat treating the cylinder; (iii) adhesively bonding each of the layers of the wound cylinder to the layers adjacent thereto with an adhesive; and (iv) forming the component by cutting a plurality of slots in at least one of the annular faces, the slots extending generally radially between the inner surface and the outer surface and having a depth less than the axial thickness. Preferably the adhesive bonding is carried out by impregnation. Optionally, a finishing step (v) is carried out comprising coating the component with a suitable surface finish. The heat-treating step comprises one or more heat treatments to modify the mechanical or magnetic properties of the amorphous metal feedstock. Such optional heat treatments facilitate machining operations and improve the magnetic properties of the component. Steps (i) to (v) may be carried out in a variety of orders and using a variety of techniques including those set forth hereinbelow.

The present invention is also directed to a unitary amorphous metal component constructed in accordance with the above-described methods. In particular, a unitary amorphous metal magnetic motor component constructed in accordance with the present invention exhibits low core loss and is suited for use as a stator in a high efficiency, axial flux, electric machine.

The present invention further provides an axial flux dynamoelectric machine, including a motor, generator, or regenerative motor incorporating the above-described unitary amorphous metal magnetic component. In an aspect of the invention, the motor is of the induction type and incorporates at least one unitary amorphous metal stator component. The induction motor optionally also incorporates a unitary amorphous metal rotor. In another aspect, the motor is a brushless, axial-flux, permanent magnet DC motor having a generally cylindrical, unitary amorphous metal stator that comprises a plurality of tooth-shaped pole sections protruding axially from the generally annular back iron region and integral therewith. The motor also comprises a disk-like rotor having at least one permanently magnetized section with at least one pair of oppositely directed magnetic poles and bearing means for rotatably supporting the stator and rotor in a predetermined position relative to each other. The magnetic poles of the rotor are located on the disk surface and generate magnetic flux directed generally perpendicular thereto.

The advantages afforded by the present invention include simplified manufacturing, reduced manufacturing time, decreased stresses (e.g., magnetostrictive) encountered during construction of bulk amorphous metal components, and optimized performance of the finished amorphous metal magnetic component. Especially beneficial is the elimination of process steps previously required to form and stack a large number of individually punched laminations. Conventional punching dies are expensive to construct and have limited usable life when stamping amorphous metal. Moreover, the present process is more flexible in accommodating design changes without the detriment of having to amortize die fabrication costs over a large production run. Motors having large diameters can be made readily with efficient utilization of magnetic material that does not result in excessive production of unusable scrap. These benefits are difficult or impossible to achieve using conventional motors and the traditional production techniques associated therewith.

The electric machine of the invention is especially advantageous for applications requiring high efficiency, high rotational speed, and high power density. The reduced core losses afforded by the magnetic component of the invention increase the machine's efficiency, the degree of improvement increasing with an increase in rotational speed. Moreover, the reduction in core losses over a component constructed using steels conventional in the motor art allows the present component and machine to be excited at higher frequency without incurring unacceptable heating due to the losses. The motor can therefore operate at higher rotational speeds. An increase in speed proportionally increases the power output for an equivalent torque level, leading also to a higher power density, i.e., a higher ratio of power output to motor weight.

BRIEF DESCRIPTION OF THE DRAWINGS

The invention will be more fully understood and further advantages will become apparent when reference is had to the following detailed description of the invention and the accompanying drawings, wherein like reference numerals denote similar elements throughout the several views, and in which.

DETAILED DESCRIPTION OF THE PREFERRED EMBODIMENTS

The present invention provides a method of constructing a unitary amorphous metal magnetic component for a high efficiency, axial-flux electric machine. The component may be a rotor or stator which has a generally cylindrical form and comprises spirally wound strips of ferromagnetic amorphous metal. A plurality of teeth protrude axially from a toroidal back iron section. The layers are preferably electrically insulated from one another to reduce eddy current losses. The amorphous metal component of the invention has substantially lower core loss than a comparable component of the prior art, thus increasing the efficiency of an electric machine employing the new component.

Previous attempts to employ amorphous metal in the construction of axial gap electric machines have not resulted in widespread commercial application, because of geometric limitations and the lack of suitable means for forming the required components by conventional punching, machining, and other cutting means.

Yet there remains a need for further improvements in motor components which exhibit substantially improved AC magnetic properties; the most important property being lower core loss. The requisite combination of high magnetic flux density, high magnetic permeability, and low core loss is afforded by use of the present magnetic component in the construction of electric machines.

Figure 1:
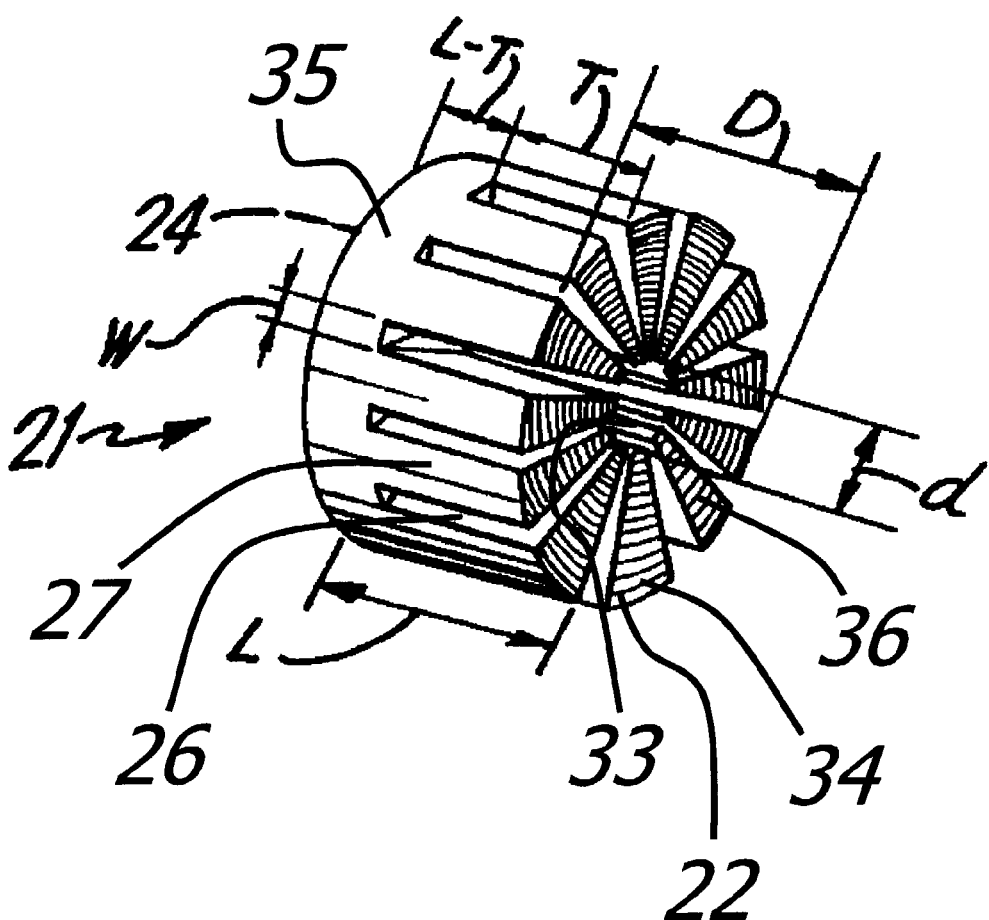
FIG. 1 is a perspective view of a unitary amorphous metal magnetic component for use in an axial flux electric motor.

Referring in detail to the drawings, there is shown in FIG. 1 a unitary amorphous metal magnetic component 21 of the invention for use in an axial flux electric motor. The component 21 is comprised of spirally wound amorphous metal tape or ribbon 34 that forms a cylindrical shape having opposing annular faces 22 and 24, and cylindrical inside and outside surfaces 33, 27. The cylindrical shape has an inside diameter d and an outside diameter D. Annular faces 22, 24 are separated by a thickness L. A plurality of slots 26 for receiving a conductive element (not shown) extend from inside surface 33 to outside surface 27. As will be recognized by one skilled in the art, the conductive element may take various forms depending on the type of machine in which the stator is to be used. The element may be a spider or like element appointed to act as a shorted secondary. Alternatively, the element may comprise electrical windings appointed to be energized by passage of electrical current supplied thereto. Each of slots 26 has a width at outside surface 27 of W and a depth T measured from annular face 22. Slots 26 are formed by cutting a wound cylinder of amorphous metal, thereby forming a plurality of teeth 34 that extend axially from generally toroidal back iron section 35. The component may employ any number of slots consistent with mechanical and operational requirements of the motor. Unitary component 21 is impregnated with an epoxy resin to give it structural and mechanical integrity sufficient for the assembly and operation of a motor in which the component is incorporated.

Figure 2:
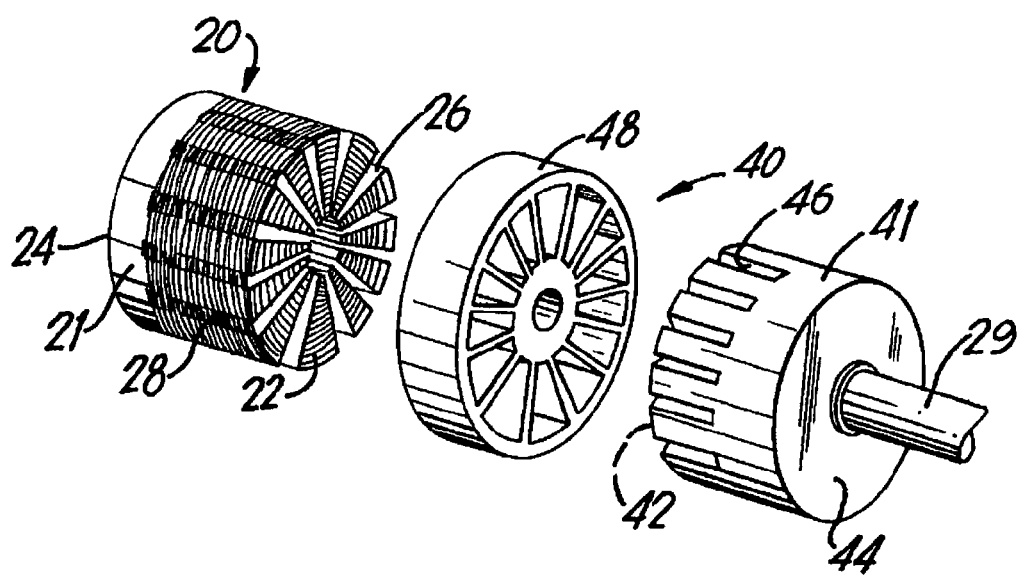
FIG. 2 is an exploded view depicting a unitary amorphous metal stator and a unitary amorphous metal rotor appointed for incorporation in an induction electric machine in accordance with the present invention.

FIG. 2 depicts stator assembly 20, comprising a first core element 21, like that depicted by FIG. 1, along with conductive electrical windings 28 encircling teeth 34 in an arrangement known to those skilled in the motor art. FIG. 2 further depicts rotor 40, which comprises a similar second core element 41 having two opposed annular faces 42 and 44. The annular face 42 has a plurality of radial slots 46 for receiving conductor elements therein. As can be seen in FIG. 2, the conductor elements for the rotor 40 in the illustrated embodiment take the form of a spider 48. The spider functions as a shorted secondary which produces a magnetic field, induced by a magnetic field provided in the winding 28. The two fields act in opposition to create a force that spins the rotor 40. Although spider 48 is illustrated in the form of a one-piece cast component, the spider could be formed from a plurality of stacked stampings. Moreover, although not illustrated, instead of the spider 48, a wound rotor employing windings, a slip ring and resistors shorting the windings could be utilized. The core elements for the stator 20 and the rotor 40 may be formed in a similar manner from a spirally wound strip of amorphous metal material as described in connection with FIG. 1. Windings 28 are energized by motor drive circuitry (not shown), which may be of conventional design, to provide a source of current that produces magnetic flux causing a motor constructed with the present rotor and stator to operate.

Figure 3:
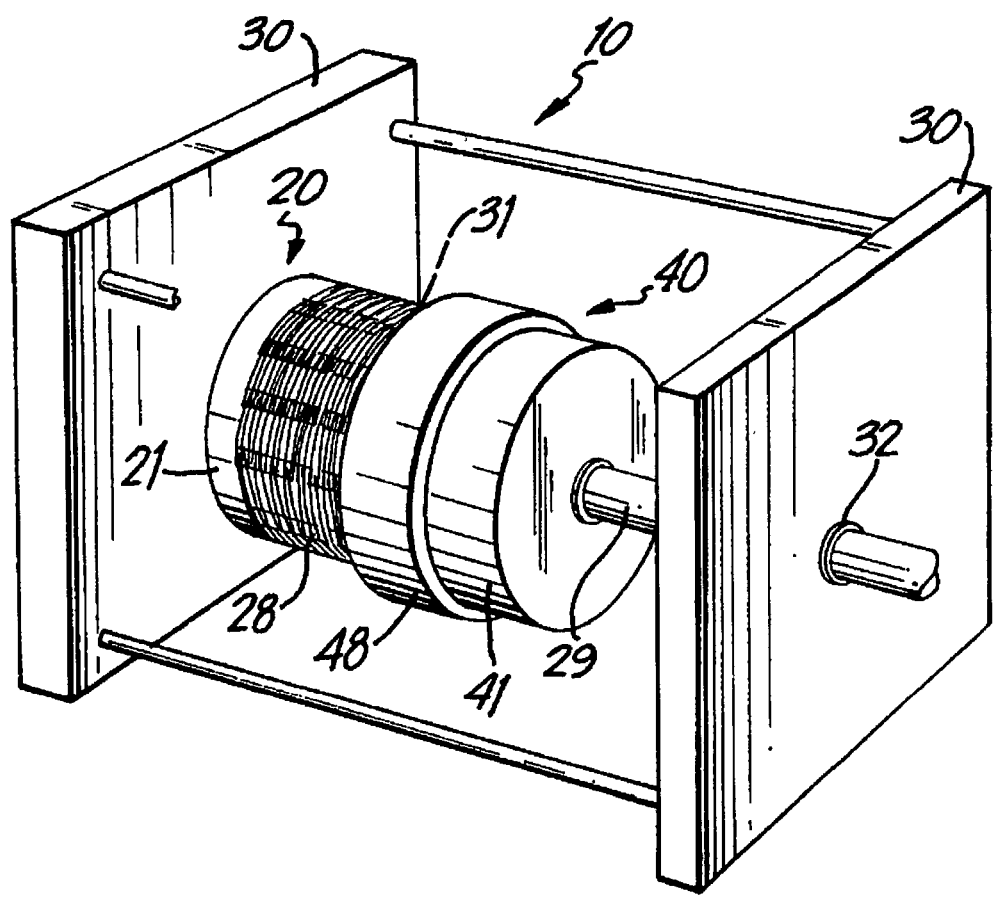
FIG. 3 is a perspective schematic view of an axial flux, induction electric machine incorporating a unitary amorphous metal magnetic stator constructed in accordance with the present invention.

FIG. 3 depicts an exemplary axial flux, induction electric machine 10 of the invention constructed using a unitary amorphous metal stator assembly 20 fixedly connected to a frame 30 and a disk-like permanent magnet rotor 40 mounted on a shaft 29 which is rotatably mounted in a bearing 32 journaled in frame 30. The rotor 40 and the stator 20 are mounted on frame 30 so that an air gap 31 is formed therebetween. Preferably the rotor and stator are sized equally, having respective inner and outer diameters that are substantially equal.

Figure 4:
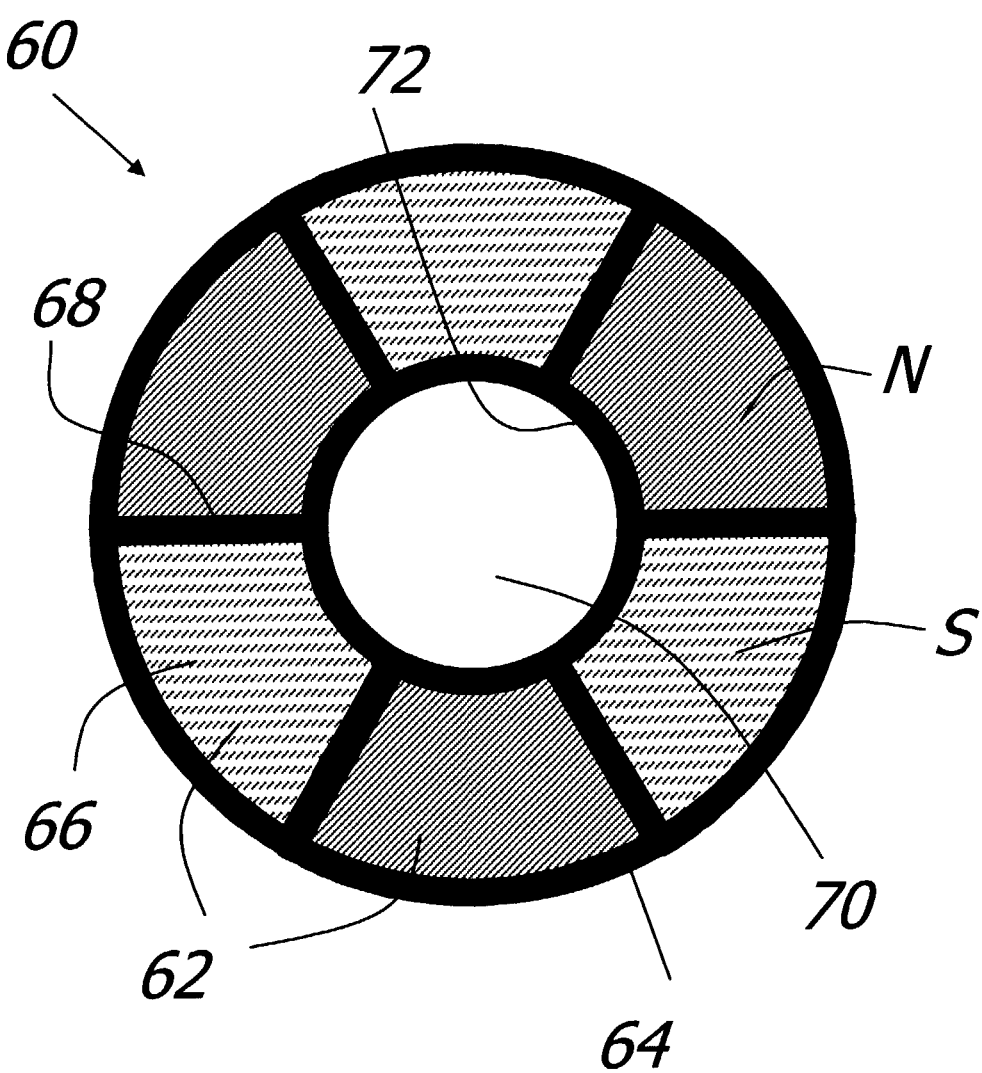
FIG. 4 is a plan view of a permanent magnet rotor for use in an axial flux, permanent magnet DC electric motor of the invention.

FIG. 4 depicts a disk-like, annular permanent magnet rotor assembly 60 for use in connection with the unitary stator core 21 depicted in FIG. 1 in a brushless, axial flux DC motor of the invention. Rotor 60 comprises six circumferentially disposed magnetic segments 62. The segments are permanently magnetized in alternating directions thereby providing magnetic poles of opposite polarity. The segments are labeled N and S to denote the respective magnetic north and south poles present on the surface of each segment 62. Each magnetized segment 62 may be comprised of a permanent magnet (such as a ferrite or rare earth magnet) adhesively affixed to an annular backing plate 64. In the embodiment shown, a surface of backing plate 64 is provided with wells 66 defined by walls 68 for receiving a segment 62. Segments 62 may be pre-magnetized prior to assembly of rotor 60, but preferably are charged after assembly using techniques known in the magnetic art. The magnetization pattern provides magnetic flux that is directed substantially perpendicular to the surface of rotor assembly, with the flux alternately directed into and out of the surface plane in alternating segments. Inner surface 72 of the annular shape of rotor assembly 60 defines a central aperture 70 therein. Shaft 29 passes through aperture 70 and is attached to rotor assembly 40 using known means, including, but not limited to, interference fits, welding, brazing, soldering, adhesive bonding, threaded engagement, riveting, pinning, or the like. Alternatively, backing plate 64 may be a solid structure without a central aperture, in which case an end of shaft 29 may attached by known attaching means either directly to plate 64 or to a flange structure (not shown) associated therewith.

The advantages recognized in constructing axial flux motors in accordance with the invention include simplified manufacturing and reduced manufacturing time, reduced stresses (i.e., magnetostrictive) encountered during construction of amorphous metal components, reduced core loss, and optimized performance of the finished motor as a result of incorporating one or more unitary amorphous metal components.

It will be recognized by those skilled in the art that the term "electric motor," as used herein, refers generically to a variety of rotating electrical machines which additionally may include electric generators as well as regenerative motors that may be operated optionally as electric generators. The described amorphous metal component may be employed in constructing any of these devices. The component presented here is suitable for use in constructing motors of a wide range of type, size and power rating, including miniature motors for microelectronic devices and actuators up to integral horsepower motors for traction and large industrial applications. The component is suitable for different types of axial flux motors, particularly including brushless and brush-type DC motors, switched reluctance motors, other synchronous motors, and induction motors. It will also be understood by those skilled in the art that axial flux motors may include one or more rotors and one or more stators. Accordingly, the terms "a rotor" and "a stator", as used herein with reference to electrical machines, include a number of rotors and stators ranging from one to as many as three or more. For example, one form of the brushless, permanent magnet DC motor of the invention comprises a disk-like rotor and two substantially mirror image stators, one being disposed coaxially on each of the opposite flat sides of the rotor. A brushless, permanent magnet DC motor may also be built with two rotors, each rotor having two substantially mirror image stators, one being disposed on each of the sides of that rotor, and the rotors and stators being mutually coaxial.

Conventional design considerations typically are thought to dictate that a radial flux electric machine must be made comparatively long to provide high shaft torque and high output power. Often the design of motors of a wide range of power ratings is based on a selection from a small number of standard lamination configurations, the nameplate rating being adjusted by changing the overall stack length. By limiting this number of configurations, the cost of fabricating different die sets is minimized and standard diameters can be chosen to reduce the amount of unavoidable scrap. In contrast, the axial flux electrical machine of the present invention is able to achieve high torque and power with a short shaft length and large diameter. Power rating is readily adjusted by altering the motor's diameter. Furthermore, the axial gap configuration is highly advantageous for many applications wherein an extended axial length is not available for mounting the machine, though a large transverse space is. Such requirements often arise in the automotive context, including traction motors for electric or hybrid vehicles and direct-drive starter-alternator systems mounted adjacent the flywheel of a vehicle's internal combustion engine. Such systems also take advantage of high pole-count designs made possible by the low losses of the amorphous metal component and machine presented herein. Other applications for which the present motor's flat, compact geometry is advantageous will suggest themselves to those skilled in the art.

A three-dimensional magnetic component 21 or 41 constructed as described exhibits low core loss. When excited at an excitation frequency "f" to a peak induction level "$B_{max}$", the component may have a core loss at room temperature less than "L" wherein L is given by the formula $L=0.0074f (B_{max})^{1.3}+0.000282f^{1.5} (B_{max})^{2.4}$, the core loss, the excitation frequency and the peak induction level being measured in watts per kilogram, hertz, and teslas, respectively. In another embodiment, the magnetic component may have (i) a core-loss equal to or less than about 1 watt-per-kilogram of amorphous metal material when operated at a frequency of approximately 60 Hz and at a flux density of approximately 1.4 Tesla (T); (ii) a core-loss equal to or less than about 12 watts-per-kilogram of amorphous metal material when operated at a frequency of approximately 1000 Hz and at a flux density of approximately 1.0 T, or (iii) a core-loss equal to or less than about 70 watt-per-kilogram of amorphous metal material when operated at a frequency of approximately 20,000 Hz and at a flux density of approximately 0.30T. The decreased core loss of the component advantageously improves the efficiency of an electrical device that incorporates it.

The low values of core loss make the bulk magnetic component especially suited for applications wherein the component is subjected to a high frequency magnetic excitation, e.g., excitation occurring at a frequency of at least about 100 Hz. The inherent high core loss of conventional steels at high frequency renders them unsuitable for use in devices requiring high frequency excitation. These core loss performance values apply to the various embodiments of the component, regardless of the specific geometry of the bulk amorphous metal component.

For example, any synchronous motor operates at a rotational speed proportional to the ratio of the excitation frequency and the number of poles in the motor. By using the described amorphous metal component instead of a conventional steel component, such a motor may be designed with a much higher pole count. Yet the motor is still operable at the same speed because the required increase in excitation frequency does not result in excessive core loss. This flexibility is especially desirable in variable speed applications. In many cases, the ability to operate over a wide speed range will allow a designer to eliminate a gear-train or transmission system that would otherwise be required with a conventional motor. Eliminating these parts from a mechanical system improves efficiency and reliability. These attributes are especially valuable for use of the present motor in vehicle traction applications, for example.

Moreover, the reduced core losses of the disclosed component allow it to be excited at higher frequency than prior art motor components composed of electrical and motor steels. Such excitation of the prior art components would be highly likely to produce sufficient heat to raise a motor to temperatures that would endanger wire insulation and other materials ordinarily used in motor construction. Thus a motor constructed using the present component can be operated at higher rotational speed, thereby delivering higher mechanical power for a given level of torque and affording a higher power density.

The bulk amorphous metal magnetic component of the invention can be manufactured using numerous ferromagnetic amorphous metal alloys in a form commonly known as strip, tape, or ribbon. Generally stated, the amorphous metal suitable for use in the component consists essentially of an alloy having the formula: $M_{70-85} Y_{5-20} Z_{0-20}$, subscripts in atom percent, wherein "M" is at least one of Fe, Ni and Co, "Y" is at least one of B, C and P, and "Z" is at least one of Si, Al and Ge; with the proviso that (i) up to ten (10) atom percent of component "M" can be replaced with at least one of the metallic species Ti, V, Cr, Mn, Cu, Zr, Nb, Mo, Ta, Hf, Ag, Au, Pd, Pt, and W, (ii) up to ten (10) atom percent of components (Y+Z) can be replaced by at least one of the non-metallic species In, Sn, Sb and Pb, and (iii) up to about one (1) atom percent of the components (M+Y+Z) can be incidental impurities. As used herein, the term "amorphous metallic alloy" means a metallic alloy that substantially lacks any long-range order and is characterized by X-ray diffraction intensity maxima which are qualitatively similar to those observed for liquids or inorganic oxide glasses.

The alloy suited for use in fabricating the component is ferromagnetic at the temperature at which the component is to be used. A ferromagnetic material is one which exhibits strong, long-range coupling and spatial alignment of the magnetic moments of its constituent atoms at a temperature below a characteristic temperature (generally termed the Curie temperature) of the material. It is preferred that the Curie temperature of material to be used in a device operating at room temperature be at least about 200° C. and preferably at least about 375° C. Devices may be operated at other temperatures, including down to cryogenic temperatures or at elevated temperatures, if the material to be incorporated therein has an appropriate Curie temperature.

As is known, a ferromagnetic material may further be characterized by its saturation induction or equivalently, by its saturation flux density or magnetization. A suitable alloy has a saturation induction of at least about 1.2 tesla (T) and, more preferably, a saturation induction of at least about 1.5 T. The alloy also has high electrical resistivity of at least about 100 μΩ-cm, and preferably at least about 130 μΩ-cm.

Amorphous metal alloys suitable for use as feedstock are commercially available, generally in the form of continuous thin strip or ribbon in widths up to 20 cm or more and in thicknesses of approximately 20–25 μm. These alloys are formed with a substantially fully glassy microstructure (e.g., at least about 80% by volume of material having a non-crystalline structure). The alloys are suitably formed with essentially 100% of the material having a non-crystalline structure. Volume fraction of non-crystalline structure may be determined by methods known in the art such as x-ray, neutron, or electron diffraction, transmission electron microscopy, or differential scanning calorimetry. Highest induction values at low cost are achieved for alloys wherein "M," "Y," and "Z" are predominantly iron, boron, and silicon, respectively. More specifically, a suitable alloy contains at least 70 atom percent Fe, at least 5 atom percent B, and at least 5 atom percent Si, with the proviso that the total content of B and Si be at least 15 atom percent. Also for this reason, amorphous metal strip composed of an iron-boron-silicon alloy is preferred. One suitable amorphous metal strip has a composition consisting essentially of about 11 atom percent boron and about 9 atom percent silicon, the balance being iron and incidental impurities. This strip, having a saturation induction of about 1.56 T and a resistivity of about 137 $\mu\Omega$-cm, is sold by Honeywell International Inc. under the trade designation METGLAS® alloy 2605SA-1. Another suitable amorphous metal strip has a composition consisting essentially of about 13.5 atom percent boron, about 4.5 atom percent silicon, and about 2 atom percent carbon, the balance being iron and incidental impurities. This strip, having a saturation induction of about 1.59 T and a resistivity of about 137 $\mu\Omega$-cm, is sold by Honeywell International Inc. under the trade designation METGLAS® alloy 2605SC. For applications in which even higher saturation induction is desired, strip having a composition consisting essentially of iron, along with about 18 atom percent Co, about 16 atom percent boron, and about 1 atom percent silicon, the balance being iron and incidental impurities, is suitable. Such strip is sold by Honeywell International Inc. under the trade designation METGLAS® alloy 2605CO. However, losses of a component constructed with this material tend to be slightly higher than those using METGLAS 2605SA-1.

The mechanical and magnetic properties of the amorphous metal strip appointed for use in the component generally may be enhanced by thermal treatment at a temperature and for a time sufficient to provide the requisite enhancement without altering the substantially fully glassy microstructure of the strip. The heat treatment comprises a heating portion, an optional soak portion and a cooling portion. A magnetic field may optionally be applied to the strip during at least a portion, such as during at least the cooling portion, of the heat treatment. Application of a field, preferably substantially along the direction in which flux lies during operation of the stator, may in some cases further improve magnetic properties of the component and reduce its core loss. Optionally, the heat treatment comprises more than one such heat cycle.

The magnetic properties of certain amorphous alloys suitable for use in a unitary amorphous metal component may be significantly improved by heat treating the alloy to form therein a nanocrystalline microstructure. This microstructure is characterized by the presence of a high density of grains having average size less than about 100 nm, preferably less than 50 nm, and more preferably about 10–20 nm. The grains preferably occupy at least 50% of the volume of the iron-base alloy. These materials have low core loss and low magnetostriction. The latter property also renders the material less vulnerable to degradation of magnetic properties by stresses resulting from the fabrication and/or operation of the component. The heat treatment needed to produce the nanocrystalline structure in a given alloy must be carried out at a higher temperature or for a longer time than would be needed for a heat treatment designed to preserve therein a substantially fully glassy microstructure. As used herein the terms amorphous metal and amorphous alloy further include a material initially formed with a substantially fully glassy microstructure and subsequently transformed by heat treatment or other processing to a material having a nanocrystalline microstructure. Amorphous alloys which may be heat treated to form a nanocrystalline microstructure are also often termed, simply, nanocrystalline alloys. The present method allows a nanocrystalline alloy to be formed into the requisite geometrical shape of the finished stator. Such formation is advantageously accomplished while the alloy is still in its as-cast, ductile, substantially non-crystalline form; before it is heat-treated to form the nanocrystalline structure which generally renders it more brittle and more difficult to handle.

Two classes of alloy having magnetic properties significantly enhanced by formation therein of a nanocrystalline microstructure are given by the following formulas in which the subscripts are in atom percent.

A first of these classes of nanocrystalline material consists essentially of an alloy having the formula $Fe_{100-u-x-y-z-w}R_uT_xQ^yB^zSi_w$, wherein R is at least one of Ni and Co, T is at least one of Ti, Zr, Hf, V, Nb, Ta, Mo, and W, Q is at least one of Cu, Ag, Au, Pd, and Pt, u ranges from 0 to about 10, x ranges from about 3 to 12, y ranges from 0 to about 4, z ranges from about 5 to 12, and w ranges from 0 to less than about 8. After this alloy is heat treated to form a nanocrystalline microstructure therein, it has high saturation induction (e.g., at least about 1.5 T), low core loss, and low saturation magnetostriction (e.g. a magnetostriction having an absolute value less than $4 \times 10^{-6}$). Such an alloy is useful for applications wherein a motor of minimum size for the required power and torque is demanded.

A second of these classes of nanocrystalline material consists essentially of an alloy having the formula $Fe_{100-u-x-y-z-w}R_uT_xQ_yB_zSi_w$, wherein R is at least one of Ni and Co, T is at least one of Ti, Zr, Hf, V, Nb, Ta, Mo, and W, Q is at least one of Cu, Ag, Au, Pd, and Pt, u ranges from 0 to about 10, x ranges from about 1 to 5, y ranges from 0 to about 3, z ranges from about 5 to 12, and w ranges from about 8 to 18. After this alloy is heat treated to form a nanocrystalline microstructure therein, it has a saturation induction of at least about 1.0T, an especially low core loss, and low saturation magnetostriction (e.g. a magnetostriction having an absolute value less than $4 \times 10^{-6}$). Such an alloy is useful in a motor required to operate at very high speed (e.g., requiring an excitation frequency of 1000 Hz or more).

Also provided is a method of constructing a bulk amorphous metal component. Generally stated, the method comprises the steps of: (i) spirally winding ferromagnetic amorphous metal strip material to form a wound cylinder of annular cross-section having a cylindrical inner surface, a cylindrical outer surface, and two annular faces, the faces being separated by an axial thickness; (ii) heat treating the cylinder; (iii) adhesively bonding each of the layers of the wound cylinder to the layers adjacent thereto with an adhesive; and (iv) forming the component by cutting a plurality of slots in at least one of the annular faces, the slots extending generally radially between the inner surface and the outer surface and having a depth less than the axial thickness. Preferably the adhesive bonding is carried out by impregnation. Optionally, a finishing step (v) is carried out comprising coating the component with a suitable surface finish. The heat-treating step comprises one or more heat treatments to modify the mechanical or magnetic properties of the amorphous metal feedstock. Such optional heat treatments facilitate machining operations and improve the magnetic properties of the component. Steps (i) to (v) may be carried out in a variety of orders and using a variety of techniques including those set forth hereinbelow. For example, heat treating step (ii) optionally is carried out after bonding step (iii) or after forming step (iv).

The thermal treatment of the amorphous metal may employ any heating means which results in the metal experiencing the required thermal profile. Suitable heating means include infra-red heat sources, ovens, fluidized beds, thermal contact with a heat sink maintained at an elevated temperature, resistive heating effected by passage of electrical current through the strip, and inductive (RF) heating. The choice of heating means may depend on the ordering of the required processing steps enumerated above. A magnetic field may optionally be applied to the amorphous metal during at least a portion, such as the cooling portion, of the heat treatment.

Heat treatment of amorphous metal material may alter its mechanical properties. Specifically, heat treatment will generally reduce the ductility of the amorphous metal, thereby limiting the amount of mechanical deformation in the amorphous metal prior to fracture, in some cases facilitating the cutting of the hard amorphous metal to form the teeth of the present component.

Adhesive means are used to adhere the layers of amorphous metal material to each other, thereby providing a bulk, three-dimensional object with sufficient structural integrity to permit cutting or machining of the slots required for the present component. The integrity also facilitates the handling and use of the component and its incorporation into a larger structure. A variety of adhesive agents may be suitable. Adhesives desirably have low viscosity, low shrinkage, low elastic modulus, high peel strength, and high dielectric strength. Preferably, the adhesive has a viscosity of less than 1000 cps and a thermal expansion coefficient approximately equal to that of the metal, or about 10 ppm. A preferred adhesive agent is composed of at least one member selected from the group consisting of varnishes, anaerobic adhesives, and room-temperature-vulcanized (RTV) silicone materials. A more preferred adhesive agent is a cyanoacrylate, such as the methyl cyanoacrylate sold under the trade name Permabond 910FS by the National Starch and Chemical Company. The device of the invention is preferably bonded by applying this adhesive such that it will penetrate between the layers of the ribbon by capillary action. Permabond 910FS is a single part, low viscosity liquid that will cure at room temperature in about 5 seconds. Still more preferred adhesive agents are epoxies, which may be either multi-part whose curing is chemically activated or single-part whose curing is activated thermally or by exposure to ultra-violet radiation. A most preferred adhesive is a low viscosity, thermally activated epoxy, such as that sold under the tradename Epoxylite 8899 by the P. D. George Co. The device of the invention is preferably bonded by impregnation with this epoxy, diluted 1:5 by volume with acetone to reduce its viscosity and enhance its penetration between the layers of the ribbon.

Adhesive may be applied to the ribbon before it is wound to form the cylinder used to prepare the component of the invention. Suitable methods for applying the adhesive include dipping, spraying, brushing, and electrostatic deposition. Amorphous metal strip may also be coated by passing it over rods or rollers which transfer adhesive to the amorphous metal. Rollers or rods having a textured surface, such as gravure or wire-wrapped rollers, are especially effective in transferring a uniform coating of adhesive onto the amorphous metal. Alternatively, and more preferably, the adhesive means may be applied to all of the layers of metal collectively, after they have been stacked. Most preferably, the wound cylinder is impregnated by capillary flow of the adhesive between the layers. The cylinder may be placed either in vacuum or under hydrostatic pressure to effect more complete filling. Such procedures result in minimizing the total volume of adhesive added, thus assuring high stacking factor. If carried out at a temperature of at least 175° C., the activation or curing of the adhesive may also serve to affect magnetic properties as discussed above.

The forming of slots in the magnetic component of the invention may be carried out using any known technique, including, but not limited to, mechanical grinding, diamond wire cutting, high-speed milling performed in either horizontal or vertical orientation, abrasive water jet milling, electric discharge machining by wire or plunge, electrochemical grinding, electrochemical machining, and laser cutting. It is preferred that the cutting method not produce any appreciable damage at or near a cut surface. Such damage may result, for example, from excessive cutting speeds that locally heat the amorphous metal above its crystallization temperature or even melt the material at or near the edge. The adverse results may include increased stress and core loss in the vicinity of the edge, interlaminar shorting, or degradation of mechanical properties.

A preferred method for cutting slots for the present component comprises electrochemical grinding. This technique removes material from the component by a combination of electrochemical and mechanical actions. An electric current is passed from a conductive, rotating cutting wheel through an electrolyte and into the component, which is also conductive. As current flows between the cutting wheel and the component, the electrolyte dissolves the component and forms soft metal oxides. The cutting wheel removes the oxidized material with minimal heating and distortion of the component, thereby providing efficient, rapid, and accurate fabrication of the component of the invention.

As noted above, the magnetic component of the invention exhibits lower core loss than similarly dimensioned components made from conventional steels. As is known in the art, core loss is that dissipation of energy which occurs within a ferromagnetic material as the magnetization thereof is changed with time. The core loss of a given magnetic component is generally determined by cyclically exciting the component. A time-varying magnetic field is applied to the component to produce therein a corresponding time variation of the magnetic induction or flux density. For the sake of standardization of measurement, the excitation is generally chosen such that the magnetic induction varies sinusoidally with time at a frequency "f" and with a peak amplitude "$B_{max}$." The core loss is then determined by known electrical measurement instrumentation and techniques. Loss is conventionally reported as watts per unit mass or volume of the magnetic material being excited. It is known in the art that loss increases monotonically with f and $B_{max}$.

Standard protocols are known for testing the core loss of soft magnetic materials {e.g. ASTM Standards A912-93 and A927(A927M-94)}. Generally they call for a sample of such materials which is situated in a substantially closed magnetic circuit, i.e. a configuration in which closed magnetic flux lines are completely contained within the volume of the sample. Such sample forms include tape-wound or punched toroids, single strips across a yoke, or stacked forms like Epstein frames. These forms also have a substantially uniform cross-section throughout, allowing testing to be done at a well-defined flux density. On the other hand, a magnetic material as employed in a motor component is situated in a magnetically open circuit, i.e. a configuration in which magnetic flux lines must traverse an air gap. Because of fringing field effects and non-uniformity of the field, a given material tested in an open circuit generally exhibits a higher core loss, i.e. a higher value of watts per unit mass or volume, than it would have in a closed-circuit measurement. The bulk magnetic component described herein advantageously exhibits low core loss over a wide range of flux densities and frequencies even in an open-circuit configuration.

Without being bound by any theory, it is believed that the total core loss of the low-loss bulk amorphous metal component is comprised of contributions from hysteresis losses and eddy current losses. Each of these two contributions is a function of the peak magnetic induction $B_{max}$ and of the excitation frequency f. The magnitude of each contribution is further dependent on extrinsic factors including the method of component construction and the thermomechanical history of the material used in the component. Prior art analyses of core losses in amorphous metals (see, e.g., G. E. Fish, J. Appl. Phys. 57, 3569(1985) and G. E. Fish et al., J. Appl. Phys. 64, 5370(1988)) have generally been restricted to data obtained for material in a closed magnetic circuit. The low hysteresis and eddy current losses seen in these analyses are driven in part by the high resistivities of amorphous metals.

The total core loss $L(B_{max}, f)$ per unit mass of the bulk magnetic component of the invention may be essentially defined by a function having the form $$L(B_{max}, f) = c_1 f(B_{max})^n + c_2 f^q (B_{max})^m$$

wherein the coefficients $c_1$ and $c_2$ and the exponents n, m, and q must all be determined empirically, there being no known theory that precisely determines their values. Use of this formula allows the total core loss of the bulk magnetic component to be determined at any required operating induction and excitation frequency. It is generally found that in the particular geometry of a motor component such as a rotor or a stator the magnetic field therein is not spatially uniform. Techniques such as finite element modeling are known in the art to provide an estimate of the spatial and temporal variation of the peak flux density that closely approximates the flux density distribution measured in an actual bulk magnetic component. Using as input a suitable empirical formula giving the magnetic core loss of a given material under spatially uniform flux density, these techniques allow the corresponding actual core loss of a given component in its operating configuration to be predicted with reasonable accuracy.

The actual measurement of core loss may be carried out using conventional methods. Magnetomotive force is applied by passing current through a first winding encircling the magnetic component. The resulting flux density is determined by Faraday's law from the voltage induced in a second winding encircling the magnetic component to be tested. The applied magnetic field is determined by Ampère's law from the magnetomotive force. The core loss is then computed from the applied magnetic field and the resulting flux density by conventional methods, such as an electronic wattmeter.

The following examples are provided to more completely describe the properties of the component described herein. The specific techniques, conditions, materials, proportions and reported data set forth to illustrate the principles and practice of the invention are exemplary only and should not be construed as limiting the scope of the invention.

EXAMPLE 1

Preparation And Electro-Magnetic Testing of a Unitary Amorphous Metal Motor Stator $Fe_{80}B_{11}Si_9$ ferromagnetic amorphous metal ribbon, approximately 26.7 mm wide and 0.022 mm thick, is spirally wound to form two substantially identical right circular cylinder assemblies, each having about 3300 layers, an outside diameter of 422 mm, and an inside diameter of 272 mm, as illustrated in FIG. 1. The cylindrical assemblies are annealed in a nitrogen atmosphere. The anneal comprises: 1) heating each assembly up to 360° C.; 2) holding the temperature at approximately 360° C. for approximately 2 hours; and, 3) cooling each assembly to ambient temperature. Each cylindrical assembly is placed in a fixture, impregnated with an epoxy resin solution, and cured at 177° C. for approximately 2.5 hours. The epoxy used is Epoxy-lite™ 8899 diluted 1:5 by volume with acetone to achieve a suitable viscosity. When fully cured, each cylindrical assembly is removed from the fixture. Each of the resulting epoxy bonded, amorphous metal cylindrical segment assemblies weighs approximately 14 kg. Then 72 equally spaced slots are cut in one of the annular end faces of each cylindrical assembly. Each of the slots is 19 mm deep and 5.8 mm wide and extends radially from the inside surface to the outside surface of the cylinder. The cutting is carried out by an electrochemical grinding process. After cutting the surface of each assembly is finished to remove excess surface epoxy and thereby form two substantially identical stators for an axial gap electric motor. The samples are disposed in coaxial alignment with their corresponding teeth in mating abutment. Suitable primary and secondary electrical windings are fixed to the cylindrical test sample assembly for electrical testing.

The test assembly exhibits core loss values of less than 1 watt-per-kilogram of amorphous metal material when operated at a frequency of approximately 60 Hz and at a flux density of approximately 1.4 Tesla (T), a core-loss of less than 12 watts-per-kilogram of amorphous metal material when operated at a frequency of approximately 1000 Hz and at a flux density of approximately 1.0 T, and a core-loss of less than 70 watt-per-kilogram of amorphous metal material when operated at a frequency of approximately 20,000 Hz and at a flux density of approximately 0.30T. The low core loss of the components of the invention renders them suitable for use in constructing a motor stator.

EXAMPLE 2

High Frequency Electro-Magnetic Testing of an Amorphous Metal Motor Stator

Two cylindrical stators comprising wound amorphous metal layers are prepared as in Example 1. Primary and secondary electrical windings are fixed to the stators. Electrical testing is carried out at 60, 1000, 5000, and 20,000 Hz and at various flux densities. Core loss values are compiled in Tables 1, 2, 3, and 4 below. As shown in Tables 3 and 4, the core loss is particularly low at excitation frequencies of 5000 Hz or higher. Thus, the stator of the invention is especially suited for use in a motor operated at high excitation frequency.

TABLE 1

Core Loss @ 60 Hz (W/kg)

| | | Material | | | |
|---|---|---|---|---|---|
| Flux Density | Amorphous $Fe_{80}B_{11}Si_9$ (22 μm) | Crystalline Fe-3% Si (25 μm) National-Arnold Magnetics Silectron | Crystalline Fe-3% Si (50 μm) National-Arnold Magnetics Silectron | Crystalline Fe-3% Si (175 μm) National-Arnold Magnetics Silectron | Crystalline Fe-3% Si (275 μm) National-Arnold Magnetics Silectron |
| 0.3 T | 0.10 | 0.2 | 0.1 | 0.1 | 0.06 |
| 0.7 T | 0.33 | 0.9 | 0.5 | 0.4 | 0.3 |
| 0.8 T | | 1.2 | 0.7 | 0.6 | 0.4 |
| 1.0 T | | 1.9 | 1.0 | 0.8 | 0.6 |
| 1.1 T | 0.59 | | | | |
| 1.2 T | | 2.6 | 1.5 | 1.1 | 0.8 |
| 1.3 T | 0.75 | | | | |
| 1.4 T | 0.85 | 3.3 | 1.9 | 1.5 | 1.1 |

TABLE 2

Core Loss @ 1,000 Hz (W/kg)

| | | Material | | | |
|---|---|---|---|---|---|
| Flux Density | Amorphous $Fe_{80}B_{11}Si_9$ (22 μm) | Crystalline Fe-3% Si (25 μm) National-Arnold Magnetics Silectron | Crystalline Fe-3% Si (50 μm) National-Arnold Magnetics Silectron | Crystalline Fe-3% Si (175 μm) National-Arnold Magnetics Silectron | Crystalline Fe-3% Si (275 μm) National-Arnold Magnetics Silectron |
| 0.3 T | 1.92 | 2.4 | 2.0 | 3.4 | 5.0 |
| 0.5 T | 4.27 | 6.6 | 5.5 | 8.8 | 12 |
| 0.7 T | 6.94 | 13 | 9.0 | 18 | 24 |
| 0.9 T | 9.92 | 20 | 17 | 28 | 41 |
| 1.0 T | 11.51 | 24 | 20 | 31 | 46 |
| 1.1 T | 13.46 | | | | |
| 1.2 T | 15.77 | 33 | 28 | | |
| 1.3 T | 17.53 | | | | |
| 1.4 T | 19.67 | 44 | 35 | | |

TABLE 3

Core Loss @ 5,000 Hz (W/kg)

| | | Material | | |
|---|---|---|---|---|
| Flux Density | Amorphous $Fe_{80}B_{11}Si_9$ (22 μm) | Crystalline Fe-3% Si (25 μm) National-Arnold Magnetics Silectron | Crystalline Fe-3% Si (50 μm) National-Arnold Magnetics Silectron | Crystalline Fe-3% Si (175 μm) National-Arnold Magnetics Silectron |
| 0.04 T | 0.25 | 0.33 | 0.33 | 1.3 |
| 0.06 T | 0.52 | 0.83 | 0.80 | 2.5 |
| 0.08 T | 0.88 | 1.4 | 1.7 | 4.4 |
| 0.10 T | 1.35 | 2.2 | 2.1 | 6.6 |
| 0.20 T | 5 | 8.8 | 8.6 | 24 |
| 0.30 T | 10 | 18.7 | 18.7 | 48 |

TABLE 4

Core Loss @ 20,000 Hz (W/kg)

| | | Material | | |
|---|---|---|---|---|
| Flux Density | Amorphous $Fe_{80}B_{11}Si_9$ (22 μm) | Crystalline Fe-3% Si (25 μm) National-Arnold Magnetics Silectron | Crystalline Fe-3% Si (50 μm) National-Arnold Magnetics Silectron | Crystalline Fe-3% Si (175 μm) National-Arnold Magnetics Silectron |
| 0.04 T | 1.8 | 2.4 | 2.8 | 16 |
| 0.06 T | 3.7 | 5.5 | 7.0 | 33 |
| 0.08 T | 6.1 | 9.9 | 12 | 53 |
| 0.10 T | 9.2 | 15 | 20 | 88 |
| 0.20 T | 35 | 57 | 82 | |
| 0.30 T | 70 | 130 | | |

EXAMPLE 3

High Frequency Behavior of Low-Loss Bulk Amorphous Metal Components

The core loss data of Example 2 above are analyzed using conventional non-linear regression methods. It is determined that the core loss of a low-loss unitary amorphous metal component comprised of $Fe_{80}B_{11}Si_9$ amorphous metal ribbon can be essentially defined by a function having the form $$L(B_{max}, f) = c_1 f(B_{max})^n + c_2 f^q (B_{max})^m.$$

Suitable values of the coefficients $c_1$ and $c_2$ and the exponents n, m, and q are selected to define an upper bound to the magnetic losses of the unitary amorphous metal component. Table 5 recites the losses of the component in Example 2 and the losses predicted by the above formula, each measured in watts per kilogram. The predicted losses as a function of f (Hz) and $B_{max}$ (Tesla) are calculated using the coefficients $c_1 = 0.0074$ and $c_2 = 0.000282$ and the exponents n=1.3, m=2.4, and q=1.5. The loss of the bulk amorphous metal component of Example 2 is less than the corresponding loss predicted by the formula.

TABLE 5

| Point | $B_{max}$ (Tesla) | Frequency (Hz) | Core Loss of Example 1 (W/kg) | Predicted Core Loss (W/kg) |
|---|---|---|---|---|
| 1 | 0.3 | 60 | 0.1 | 0.10 |
| 2 | 0.7 | 60 | 0.33 | 0.33 |
| 3 | 1.1 | 60 | 0.59 | 0.67 |
| 4 | 1.3 | 60 | 0.75 | 0.87 |
| 5 | 1.4 | 60 | 0.85 | 0.98 |
| 6 | 0.3 | 1000 | 1.92 | 2.04 |
| 7 | 0.5 | 1000 | 4.27 | 4.69 |
| 8 | 0.7 | 1000 | 6.94 | 8.44 |
| 9 | 0.9 | 1000 | 9.92 | 13.38 |
| 10 | 1 | 1000 | 11.51 | 16.32 |
| 11 | 1.1 | 1000 | 13.46 | 19.59 |
| 12 | 1.2 | 1000 | 15.77 | 23.19 |
| 13 | 1.3 | 1000 | 17.53 | 27.15 |
| 14 | 1.4 | 1000 | 19.67 | 31.46 |
| 15 | 0.04 | 5000 | 0.25 | 0.61 |
| 16 | 0.06 | 5000 | 0.52 | 1.07 |
| 17 | 0.08 | 5000 | 0.88 | 1.62 |
| 18 | 0.1 | 5000 | 1.35 | 2.25 |
| 19 | 0.2 | 5000 | 5 | 6.66 |
| 20 | 0.3 | 5000 | 10 | 13.28 |
| 21 | 0.04 | 20000 | 1.8 | 2.61 |
| 22 | 0.06 | 20000 | 3.7 | 4.75 |
| 23 | 0.08 | 20000 | 6.1 | 7.41 |
| 24 | 0.1 | 20000 | 9.2 | 10.59 |
| 25 | 0.2 | 20000 | 35 | 35.02 |
| 26 | 0.3 | 20000 | 70 | 75.29 |

Having thus described the invention in rather full detail, it will be understood that such detail need not be strictly adhered to but that various changes and modifications may suggest themselves to one skilled in the art, all falling within the scope of the present invention as defined by the subjoined claims.

What is claimed is:

1. A method of constructing a low core loss, unitary amorphous metal magnetic component for an electric machine, comprising:

spirally winding ferromagnetic amorphous metal strip material to form a plurality of layers of a wound cylinder of annular cross-section having cylindrical inner and outer surfaces and two annular faces, said faces being separated by an axial thickness;

after winding, performing the following operations;

heat treating said cylinder;

bonding and curing each of the layers of said wound cylinder to the layers adjacent thereto with an adhesive agent by applying to said wound cylinder an adhesive to at least one of the annular faces wherein said adhesive impregnates the wound cylinder by flowing between the layers; and forming said component by cutting a plurality of slots in at least one of said annular faces, said slots extending between said inner surface and said outer surface and having a depth less than said axial thickness, wherein said ferromagnetic amorphous metal strip has a composition defined essentially by the formula: $M_{70-85}$ $Y_{5-20} Z_{0-20}$, subscripts in atom percent, where "M" is at least one of Fe, Ni or Co, "Y" is at least one of B, C or P, and "Z" is at least one of Si, Al or Ge; with the provisos that (i) up to 10 atom percent of component "M" can be replaced with at least one of the metallic species Ti, V, Cr, Mn, Cu, Zr, Nb, Mo, Ta, Hf, Ag, Au, Pd, Pt, or W, (ii) up to 10 atom percent of components (Y+Z) can be replaced by at least one of the non-metallic species In, Sn, Sb or Pb and (iii) up to about one (1) atom percent of the components (M+Y+Z) can be incidental impurities.

2. A method as recited by claim 1, wherein said adhesive agent is composed of at least one member selected from the group consisting of varnishes, anaerobic adhesives, and room-temperature-vulcanized (RTV) silicone materials.

3. A method as recited by claim 1, wherein said adhesive agent is composed of a cyanoacrylate.

4. A method as recited by claim 1, wherein said adhesive agent is composed of an epoxy.

5. A method as recited by claim 4, wherein said epoxy is a low-viscosity, thermally activated epoxy.

6. A method as recited by claim 1, further comprising the finishing said component by coating it with a suitable surface finish.

7. A method as recited by claim 1, wherein the operations performed after winding are performed in the following order:

bonding and curing each of the layers of said wound cylinder to the layers adjacent thereto with an adhesive agent by applying to said wound cylinder an adhesive to at least one of the annular faces;

heat treating, after bonding and curing, said cylinder; and forming, after heat treating, said component by cutting a plurality of slots in at least one of said annular faces, said slots extending between said inner surface and said outer surface and having a depth less than said axial thickness.

8. A method as recited by claim 1, wherein the operations performed after winding are performed in the following order:

bonding and curing each of the layers of said wound cylinder to the layers adjacent thereto with an adhesive agent by applying to said wound cylinder an adhesive to at least one of the annular faces;

forming, after bonding and curing, said component by cutting a plurality of slots in at least one of said annular faces, said slots extending between said inner surface and said outer surface and having a depth less than said axial thickness; and heat treating said cylinder after forming said component.

9. A method as recited by claim 1, wherein said heat treatment comprises a heat-up, a soak, and a cool-down, and a magnetic field is applied to said component during at least said cool-down.

10. A method as recited by claim 1, wherein said cutting is carried out by a process comprising electrochemical grinding.

11. A method as recited by claim 1, wherein said ferromagnetic amorphous metal strip has a composition containing at least 70 atom percent Fe, at least 5 atom percent B, and at least 5 atom percent Si, with the proviso that the total content of B and Si is at least 15 atom percent.

12. A method as recited by claim 11, wherein said M component is substantially Fe, said Y component is substantially B, and said Z component is substantially Si.

13. A method as recited by claim 11, wherein said ferromagnetic amorphous metal strip has a composition defined essentially by the formula $Fe_{80}B_{11}Si_9$.

14. A method of constructing a low core loss, unitary amorphous metal magnetic component for an electric machine, comprising: spirally winding ferromagnetic amorphous metal strip material to form a plurality of layers of a wound cylinder of annular cross-section having cylindrical inner and outer surfaces and two annular faces, said faces being separated by an axial thickness; after winding performing the following operations: heat treating said cylinder; bonding each of the layers of said wound cylinder to the layers adjacent thereto with an adhesive agent by applying to said wound cylinder an adhesive to at least one of the annular faces wherein said adhesive impregnates the wound cylinder by flowing between the layers; and forming said component by cutting a plurality of slots in at least one said annular faces, said slots extending between said inner surface and said outer surface and having a depth less than said axial thickness, wherein the heat treating forms a nanocrystalline microstructure in said amorphous metal magnetic strip to form the low core loss, unitary amorphous metal magnetic component.

15. A method as recited by claim 14, said ferromagnetic amorphous metal strip having a composition defined essentially by the formula: $Fe_{100-u-x-y-z-w}R_uT_xQ_yB_zSi_w$, wherein R is at least one of Ni and Co, T is at least one of Ti, Zr, Hf, V, Nb, Ta, Mo, or W, Q is at least one of Cu, Ag, Au, Pd, or Pt, u ranges from 0 to about 10, x ranges from about 3 to 12, y ranges from 0 to about 4, z ranges from about 5 to 12, and w ranges from about 0 to less than about 8.

16. A method as recited by claim 14, said ferromagnetic amorphous metal strip having a composition defined essentially by the formula: $F_{100-u-x-y-zw}R_uT_xQ_yB_zSi_w$, wherein R is at least one of Ni and Co, T is at least one of Ti, Zr, Hf, V, Nb, Ta, Mo, or W, Q is at least one of Cu, Ag, Au, Pd, or Pt, u ranges from 0 to about 10, x ranges from about 1 to 5, y ranges from 0 to about 3, z ranges from about 5 to 12, and w ranges from about 8 to 18.

\* \* \* \* \*

UNITED STATES PATENT AND TRADEMARK OFFICE
CERTIFICATE OF CORRECTION

PATENT NO. : 7,144,468 B2
APPLICATION NO. : 10/235068
DATED : December 5, 2006
INVENTOR(S) : Nicholas J. Decristofaro et al.

It is certified that error appears in the above-identified patent and that said Letters Patent is hereby corrected as shown below:

Column 20, Line 1, change "operations;" to --operations:--.

Column 22, Line 16, change "and" to --or--.

Column 22, Line 20, after "from" delete "about".

Column 22, Line 23, change "$F_{100-u-x-y-zw}R_uT_xQ_yB_zSi_w$," to --$Fe_{100-u-x-y-z-w}R_uT_xQ_yB_zSi_w$,--.

Column 22, Line 24, change "and" to --or--.

Signed and Sealed this

Twenty-third Day of March, 2010

David J. Kappos
*Director of the United States Patent and Trademark Office*